US012665792B2

(12) United States Patent
Ding et al.

(10) Patent No.: US 12,665,792 B2
(45) Date of Patent: Jun. 23, 2026

(54) INPUT IMPEDANCE MATCHING NETWORK AND RADIO FREQUENCY FRONT-END MODULE

(71) Applicant: RadRock (Chongqing) Tech Co., Ltd., Chongqing (CN)

(72) Inventors: Tuanjie Ding, Shenzhen (CN); Jianxing Ni, Shenzhen (CN)

(73) Assignee: RadRock (Chongqing) Tech Co., Ltd., Chongqing (CN)

( * ) Notice: Subject to any disclaimer, the term of this patent is extended or adjusted under 35 U.S.C. 154(b) by 361 days.

(21) Appl. No.: 18/270,269

(22) PCT Filed: Dec. 9, 2021

(86) PCT No.: PCT/CN2021/136814
§ 371 (c)(1),
(2) Date: Jun. 29, 2023

(87) PCT Pub. No.: WO2022/143085
PCT Pub. Date: Jul. 7, 2022

(65) Prior Publication Data
US 2024/0314002 A1 Sep. 19, 2024

(30) Foreign Application Priority Data
Dec. 31, 2020 (CN) .......................... 202011637066.3

(51) Int. Cl.
H04L 25/02 (2006.01)
H04B 1/18 (2006.01)

(52) U.S. Cl.
CPC ........... H04L 25/0272 (2013.01); H04B 1/18 (2013.01)

(58) Field of Classification Search
CPC ....... H01L 2924/00014; H01L 2924/00; H01L 2224/48091; H01L 2224/16225;
(Continued)

(56) References Cited

U.S. PATENT DOCUMENTS 6,987,326 B1 * 1/2006 Jin ........................ H10W 42/60
257/784
2006/0071735 A1 4/2006 Kang
(Continued)

FOREIGN PATENT DOCUMENTS

| CN | 101009276 A | 8/2007 |
| CN | 101932189 A | 12/2010 |

(Continued)

OTHER PUBLICATIONS

International Search Report of PCT Patent Application No. PCT/CN2021/136814 issued on Feb. 17, 2022.

*Primary Examiner* — Ajibola A Akinyemi

(57) ABSTRACT

Provided are an input impedance matching network and a RF front-end module. The input impedance matching network comprises a first pad, a second pad, and a first inductor with one end connected to the first pad and another end connected to the second pad; an output end of the second pad, as an output end of the input impedance matching network, is configured to be connected to an input end of a low noise amplifier; the input impedance matching network further comprises a compensation regulation circuit connected with the first pad and/or the second pad, and the compensation regulation circuit is configured to regulate a parasitic capacitance of the first pad to the ground and/or a parasitic capacitance of the second pad to the ground, so that the parasitic capacitance of the first pad to the ground is greater than that of the second pad to the ground.

13 Claims, 5 Drawing Sheets

(58) Field of Classification Search
　　　CPC . H01L 2224/49171; H01L 2224/73265; H01L
　　　　　　　　2224/32145; H01L 2223/6655; H01L
　　　　　　　　2224/48227; H01L 23/66; H01L 2223/665
　　　USPC ...................................................... 455/196.1
　　　See application file for complete search history.

(56) References Cited

U.S. PATENT DOCUMENTS

| | | | |
|---|---|---|---|
| 2007/0001704 | A1 | 1/2007 | O'Mahony |
| 2009/0206962 | A1* | 8/2009 | Chou ........................ H04B 3/14 |
| | | | 333/28 R |
| 2010/0067154 | A1* | 3/2010 | Deng ..................... H10D 89/60 |
| | | | 361/56 |
| 2011/0163935 | A1 | 7/2011 | de Jongh et al. |

FOREIGN PATENT DOCUMENTS

| | | | |
|---|---|---|---|
| CN | 102823129 | A | 12/2012 |
| CN | 105242125 | A | 1/2016 |
| CN | 108901123 | A | 11/2018 |
| GB | 2466776 | A | 7/2010 |
| WO | 2020188146 | A1 | 9/2020 |

* cited by examiner

INPUT IMPEDANCE MATCHING NETWORK AND RADIO FREQUENCY FRONT-END MODULE

The present application claims the priority of China Patent Application No. 202011637066.3, filed on Dec. 31, 2020, entitled "Input impedance matching network and RF front-end module", the contents of which are incorporated herein by reference in their entirety.

TECHNICAL FIELD

The application relates to the technical field of radio frequency communication, in particular to an input impedance matching network and a RF front-end module.

BACKGROUND

As the first stage of the receiver, the performance of the low noise amplifier plays an important role in the performance of the whole receiver system. The signal-to-noise ratio (SNR) of the whole receiver system largely depends on the noise figure (NF) and gain of the low noise amplifier. Therefore, designing a low noise amplifier with good performance has become an important goal of RF front-end design. According to the formula of Cascaded Noise, the input impedance matching network of low noise amplifier has a great influence on the noise figure of low noise amplifier, and also affects the gain of low noise amplifier. Generally, the input matching of low noise amplifier is realized by a series inductor. However, due to the existence of SMD pads, some inevitable parasitic capacitances are often generated, which leads to input impedance mismatch and affects the performance of low noise amplifier.

SUMMARY

The embodiments of the present application provide an input impedance matching network and a RF front-end module, aiming to solve the problem of impedance mismatch caused by parasitic capacitance introduced by bonding pads in actual circuits.

The embodiments of the application provide an input impedance matching network, including a first pad, a second pad, and a first inductor with one end connected to the first pad and another end connected to the second pad; an output end of the second pad, as an output end of the input impedance matching network, is configured to be connected to an input end of a low noise amplifier; the input impedance matching network further includes a compensation regulation circuit connected with the first pad and/or the second pad, and the compensation regulation circuit is configured to regulate a parasitic capacitance of the first pad to a ground and/or a parasitic capacitance of the second pad to a ground, so that the parasitic capacitance of the first pad to the ground is greater than that of the second pad to the ground.

Preferably, the compensation regulation circuit includes a capacitance compensation circuit arranged between the first pad and the ground, used for increasing the parasitic capacitance of the first pad to the ground.

Preferably, the capacitance compensation circuit includes at least two compensation metal plates arranged in parallel and oppositely, and projections of the at least two compensation metal plates at least partially overlap in a longitudinal direction; the compensation metal plate includes a first compensation metal plate and a second compensation metal plate; the first compensation metal plate and the second compensation metal plate are crossed, the first compensation metal plate is connected with the ground, and the second compensation metal plate is connected with the first pad.

Preferably, the compensation metal plate and the first pad are arranged on different layers of a substrate.

Preferably, the capacitance compensation circuit includes a third pad, a second inductor and a fourth pad connected in series; the third pad is connected with the first pad, and the fourth pad is connected with the ground.

Preferably, the third pad, the second inductor, the fourth pad and the first pad are arranged on a same layer of the substrate.

Preferably, the compensation regulation circuit includes a capacitance regulation circuit arranged between the second pad and the ground, used for reducing the parasitic capacitance of the second pad to the ground.

Preferably, the first pad, the first inductor and the second pad are arranged on a same layer of the substrate.

The embodiment of the application provides a RF front-end module, including an input impedance matching network and a low noise amplifier connected to the input impedance matching network;

the input impedance matching network includes a first pad, a second pad, and a first inductor with one end connected to the first pad and another end connected to the second pad; an output end of the second pad, as an output end of the input impedance matching network, is configured to be connected to an input end of a low noise amplifier; the input impedance matching network further includes a compensation regulation circuit connected with the first pad and/or the second pad, and the compensation regulation circuit is configured to regulate a parasitic capacitance of the first pad to a ground and/or a parasitic capacitance of the second pad to a ground, so that the parasitic capacitance of the first pad to the ground is greater than that of the second pad to the ground.

Preferably, the compensation regulation circuit includes a capacitance compensation circuit arranged between the first pad and the ground, used for increasing the parasitic capacitance of the first pad to the ground.

Preferably, the capacitance compensation circuit includes at least two compensation metal plates arranged in parallel and oppositely, and projections of the at least two compensation metal plates at least partially overlap in a longitudinal direction; the compensation metal plate includes a first compensation metal plate and a second compensation metal plate; the first compensation metal plate and the second compensation metal plate are crossed, the first compensation metal plate is connected with the ground, and the second compensation metal plate is connected with the first pad.

Preferably, the compensation metal plate and the first pad are arranged on different layers of a substrate.

Preferably, the capacitance compensation circuit includes a third pad, a second inductor and a fourth pad connected in series; the third pad is connected with the first pad, and the fourth pad is connected with the ground.

Preferably, the third pad, the second inductor, the fourth pad and the first pad are arranged on a same layer of the substrate.

Preferably, the compensation regulation circuit includes a capacitance regulation circuit arranged between the second pad and the ground, used for reducing the parasitic capacitance of the second pad to the ground.

Preferably, the first pad, the first inductor and the second pad are arranged on a same layer of the substrate.

Preferably, the low noise amplifier includes a RF amplification circuit, a first capacitive element, a second capacitive element and an impedance matching circuit; one end of the RF amplification circuit is connected with the second pad, and another end is connected with a signal output end through the first capacitive element; one end of the second capacitive element is connected with a connection node between the RF amplification circuit and the first capacitive element, and another end is connected with the ground; one end of the impedance matching circuit is connected with a pow supply end, and another end is connected with a connection node between the RF amplification circuit and the first capacitive element.

According to the above input impedance matching network and RF front-end module, a first pad, a second pad, and a first inductor with one end connected to the first pad and another end connected to the second pad; the first pad is used as an input end of the input impedance matching network, the second pad 12 is used as an output end of the input impedance matching network, and is configured to be connected to an input end of a low noise amplifier; the compensation regulation circuit connected with the first pad or the second pad is adopted to regulate the parasitic capacitance of the first pad to the ground and/or a parasitic capacitance of the second pad to the ground, so that the parasitic capacitance of the first pad to the ground is greater than that of the second pad to the ground. This solution could alleviate the problem of impedance mismatch caused by the fact that the parasitic capacitance of the first pad to the ground and the parasitic capacitance of the second pad to the ground are equal, and thus realizing the impedance matching at the input end of the low noise amplifier.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

4

Figure 10:
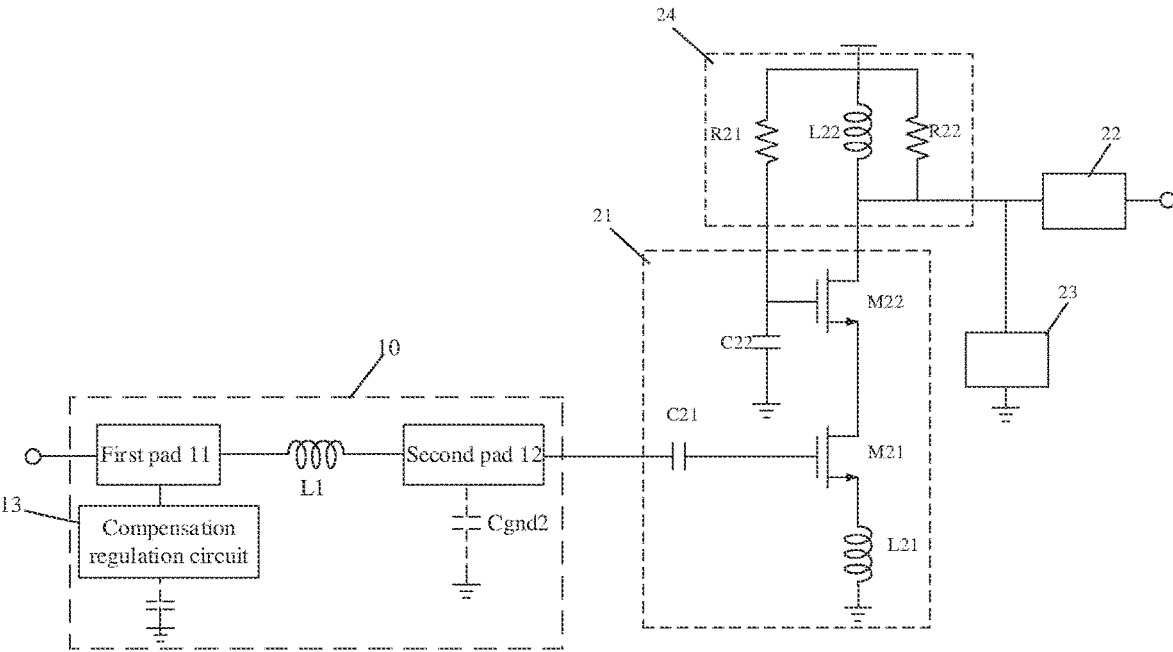

FIG. 10 is a schematic circuit diagram of an RF front-end module according to an embodiment of the present application.

DETAILED DESCRIPTION OF PREFERRED EMBODIMENTS

The technical solutions in the embodiments of the present application will be clearly and completely described below with reference to the drawings in the embodiments of this application. Obviously, the described embodiments are part of the embodiments of this application, but not all of them. Based on the embodiments in this application, all other embodiments obtained by those of ordinary skill in the art without creative effort belong to the protection scope of this application.

It should be understood that the exemplary embodiments may be embodied in many different forms and should not be construed as being limited to the exemplary embodiments set forth herein. Rather, these embodiments are provided so that this disclosure will be thorough and complete, and will fully convey the protection scope of this application to those skilled in the art. In the drawings, like reference signs refer to like elements throughout, and the size and relative sizes of layers and regions may be exaggerated for clarity.

It should be understood that when an element or layer is referred to as being "on", "adjacent to", "connected with" or "coupled to" other elements or layers, it may be directly on, adjacent to, connected with or coupled to other elements or layers, or intervening elements or layers. Rather, when an element is referred to as being "directly on", "directly adjacent to", "directly connected with" or "directly coupled to" other elements or layers, there is no intervening element or layer. It should be understood that although the terms first, second, third, etc. are used to describe various elements, components, areas, layers and/or parts, these elements, components, areas, layers and/or parts should not be limited by these terms. These terms are only used to distinguish one element, part, area, layer or part from another element, part, area, layer or part. Therefore, without departing from the teachings of this application, the first element, part, area, layer or part discussed below may be represented as the second element, part, area, layer or part.

Spatial terms such as "below". "under". "above" and "on" may be used here for convenience of description to describe the relationship between one element or feature and other elements or features shown in the figures. It should be understood that in addition to the orientations shown in the figures, the spatial relationship terms are intended to include different orientations of devices in use and operation. For example, if the device in the figures is turned upside down, then the elements or features described as "below" or "under" other elements or features would be "above" or "on" other elements or features. Therefore, the exemplary terms "below" or "under" may include the orientations of "above" or "on". The device may be otherwise oriented (rotated by 90 degrees or other orientations) and the spatial description terms used here are interpreted accordingly.

The terms used here are only for the purpose of describing specific embodiments and not as a limitation of the present application. As used herein, singular forms of "a", "an" and "the/said" are also intended to include plural forms, unless the context clearly indicates otherwise. It should also be understood that the terms "comprise" and/or "include" used in this specification specify the presence of said features, integers, steps, operations, elements and/or components, but do not exclude the presence or addition of one or more other features, integers, steps, operations, elements, components and/or groups. As used herein, the term "and/or" includes any and all combinations of related listed items.

For a thorough understanding of this application, detailed structures and steps will be set forth in the following description, so as to illustrate the technical solution proposed in the present application. The preferred embodiments of the present application are described in detail as follows, but besides these detailed descriptions, the present application may also have other embodiments.

Figures 3, 4:
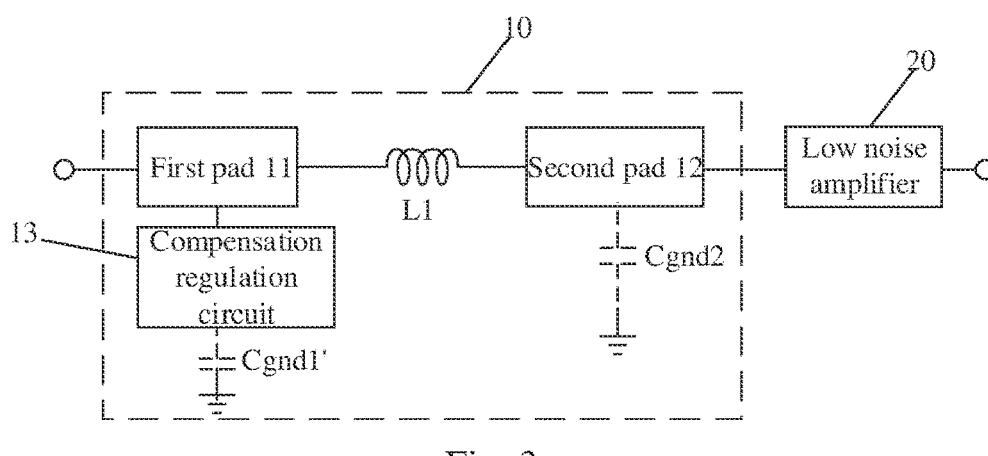
FIG. 3 is a circuit diagram of an input impedance matching network according to an embodiment of the present application.
FIG. 4 is a Smith chart of the input impedance matching network shown in FIG. 3.

An embodiment of the present application provides an input impedance matching network 10, as shown in FIG. 3, it includes a first pad 11, a second pad 12, and a first inductor L1 with one end connected to the first pad 11 and another end connected to the second pad 12; an output end of the second pad 12, as an output end of the input impedance matching network 10, is configured to be connected to an input end of a low noise amplifier 20; the input impedance matching network 10 further includes a compensation regulation circuit 13 connected with the first pad 11 and/or the second pad 12, and the compensation regulation circuit 13 is configured to regulate a parasitic capacitance of the first pad 11 to the ground and/or a parasitic capacitance of the second pad 12 to the ground, so that the parasitic capacitance of the first pad 11 to the ground is greater than that of the second pad 12 to the ground.

As an example, the input impedance matching network 10 includes a first pad 11, a second pad 12, and a first inductor L1 with one end connected to the first pad 11 and the other end connected to the second pad 12. The first pad 11 serves as the input end of the input impedance matching network 10, and the second pad 12 serves as the output end of the input impedance matching network 10, and is configured to be connected to the input end of the low noise amplifier 20 for filtering the input interference of the low noise amplifier 20. Because each pad and GND metal plane (ground end) form a parallel plate capacitor, the first pad 11 will generate a parasitic capacitance to the ground (Cgnd1) and the second pad 12 will generate a parasitic capacitance to the ground (Cgnd2). Generally speaking, the first pad 11 and the second pad 12 are the same type of pads, thus the parasitic capacitance generated by the first pad 11 to the ground (Cgnd1) and the parasitic capacitance generated by the second pad 12 to the ground (Cgnd2) are equal, that is, Cgnd1=Cgnd2, which would cause the problem of impedance mismatch.

Figures 1, 2:
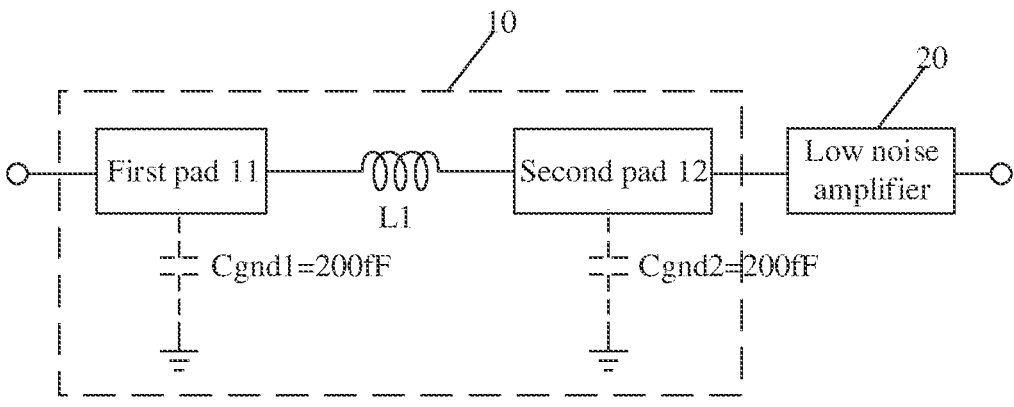
FIG. 1 is a schematic circuit diagram of an input impedance matching network in the prior art.
FIG. 2 is a Smith chart of the input impedance matching network shown in FIG. 1.

As shown in FIG. 1, if the parasitic capacitance generated by the first pad 11 to the ground (Cgnd1) and the parasitic capacitance generated by the second pad 12 to the ground (Cgnd2) are both 200 fF, and the inductance value of the first inductor L1 is 3.3 nH, then the Smith chart of the input impedance matching network 10 of FIG. 1 would be like FIG. 2, point A is the conjugate point of the input impedance. In an ideal state, if there are no parasitic capacitances Cgnd1 and Cgnd2, the impedance value of the low noise amplifier 20 should be directly shifted from point O to the input impedance conjugate point A under the effect of the first inductance L1, so as to realize the impedance matching of the circuit. However, in real practice, when the input impedance matching network 10 is working, under the influence of the parasitic capacitance of the first pad 11 to the ground (Cgnd1), the impedance value of the low noise amplifier 20 moves from point O to point B1. Then, under the influence of the first inductance L1, the impedance value of the low noise amplifier 20 moves from point B1 to point C1. Finally, under the influence of the parasitic capacitance of the second pad 12 to the ground (Cgnd2), the impedance value of the low noise amplifier 20 moves from point C1 to point D1, which causes the problem of input impedance mismatch of the low-noise amplifier 20, and affects the performance of the low noise amplifier 20.

In order to alleviate the problem of impedance mismatch caused by the fact that the parasitic capacitance generated by the first pad 11 (Cgnd1) and the parasitic capacitance generated by the second pad 12 (Cgnd2) are equal, the input impedance matching network 10 is also provided with a compensation regulation circuit 13 connected with the first pad 11 or the second pad 12, and the parasitic capacitance of the first pad 11 to the ground is increased, or the parasitic capacitance of the second pad 12 to the ground is reduced by the compensation regulation circuit 13, so that the parasitic capacitance generated by the first pad 11 to the ground (Cgnd1) is greater than that generated by the second pad 12 to the ground (Cgnd2), thereby alleviating the impedance mismatch problem caused by the equal parasitic capacitance of the first pad 11 to the ground (Cgnd1) and the parasitic capacitance of the second pad 12 to the ground (Cgnd2), thus realizing the impedance matching at the input end of the low noise amplifier 20.

For example, the compensation regulation circuit 13 connected to the first pad 11 or the second pad 12 is used for regulation to increase the parasitic capacitance of the first pad 11 to the ground, so that the parasitic capacitance of the first pad 11 to the ground (Cgnd1) is greater than the parasitic capacitance of the second pad 12 to the ground (Cgnd2). For example, the original parasitic capacitances generated by the first pad 11 and the second pad 12 to the ground are both 200 fF. After the first pad 11 is connected to the first compensation regulation circuit 13, the parasitic capacitance generated by the first pad 11 to the ground (Cgnd1) is increased from 200 fF to 640 fF, while the parasitic capacitance generated by the second pad 12 to the ground (Cgnd2) is not changed, then the Smith chart of the input impedance matching network 10 of FIG. 3 would be like FIG. 4, point A is the conjugate point of the input impedance. In an ideal state, if there are no parasitic capacitances Cgnd1 and Cgnd2, the impedance value of the low noise amplifier 20 should be directly shifted from point O to the input impedance conjugate point A under the effect of the first inductance L1, so as to realize the impedance matching of the circuit. However, in real practice, when the input impedance matching network 10 is working, under the influence of the parasitic capacitance of the first pad 11 to the ground (Cgnd1), the impedance value of the low noise amplifier 20 moves from point O to point B2. Then, under the influence of the first inductance L1, the impedance value of the low noise amplifier 20 moves from point B2 to point C2. Finally, under the influence of the parasitic capacitance of the second pad 12 to the ground (Cgnd2), the impedance value of the low noise amplifier 20 moves from point C2 to point D2. It can be seen from the Smith chart of FIGS. 2 and 4, when the parasitic capacitance of the first pad 11 to the ground (Cgnd1) is increased from 200 fF to 640 fF, point D2 shown in FIG. 4 is closer to the input impedance conjugate point A than point D1 shown in FIG. 2. Therefore, by increasing the parasitic capacitance of the first pad 11 to the ground, the problem of input impedance mismatch caused by the equal parasitic capacitances of the first pad 11 and second pad 12 to the ground can be alleviated, and the performance of the low noise amplifier 20 can be improved.

Figures 5, 6:
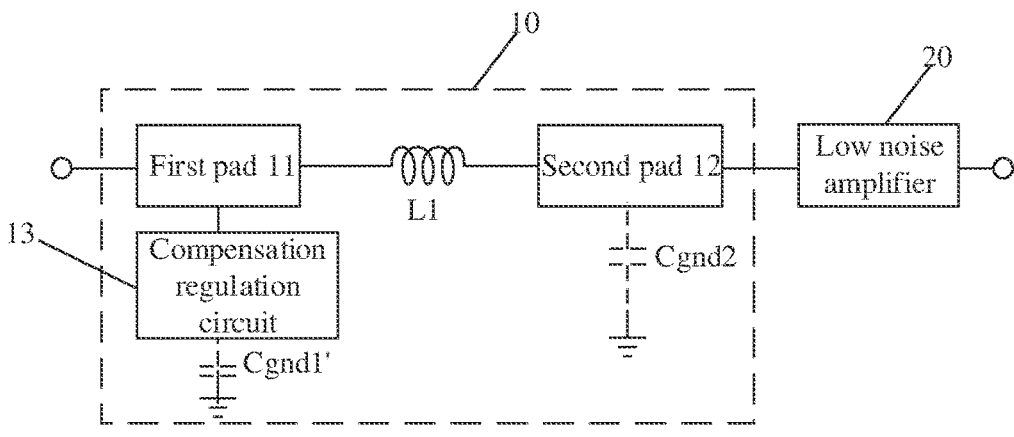
FIG. 5 is another Smith chart of the input impedance matching network shown in FIG. 3.
FIG. 6 is a circuit diagram of an input impedance matching network according to an embodiment of the present application.

For another example, the compensation regulation circuit 13 connected to the first pad 11 or the second pad 12 is used for regulation to reduce the parasitic capacitance of the second pad 12 to the ground, so that the parasitic capacitance of the first pad 11 to the ground (Cgnd1) is greater than the parasitic capacitance of the second pad 12 to the ground (Cgnd2). For example, the original parasitic capacitances generated by the first pad 11 and the second pad 12 to the ground are both 200 fF. After the first pad 12 is connected to the first compensation regulation circuit 13, the parasitic capacitance generated by the first pad 12 to the ground (Cgnd1) is increased from 200 fF to 640 fF, while the parasitic capacitance generated by the second pad 11 to the ground (Cgnd2) is not changed, then the Smith chart of the input impedance matching network 10 of FIG. 3 would be like FIG. 5, point A is the conjugate point of the input impedance. In an ideal state, if there are no parasitic capacitances Cgnd1 and Cgnd2, the impedance value of the low noise amplifier 20 should be directly shifted from point O to the input impedance conjugate point A under the effect of the first inductance L1, so as to realize the impedance matching of the circuit. However, in real practice, when the input impedance matching network 10 is working, under the influence of the parasitic capacitance of the first pad 11 to the ground (Cgnd1), the impedance value of the low noise amplifier 20 moves from point O to point B2. Then, under the influence of the first inductance L1, the impedance value of the low noise amplifier 20 moves from point B2 to point C2. Finally, under the influence of the parasitic capacitance of the second pad 12 to the ground (Cgnd2), the impedance value of the low noise amplifier 20 moves from point C2 to point D2. It can be seen from the Smith chart of FIGS. 2 and 5, when the parasitic capacitance of the first pad 12 to the ground (Cgnd1) is increased from 200 fF to 640 fF, point D2 shown in FIG. 5 is closer to the input impedance conjugate point A than point D1 shown in FIG. 2. Therefore, by increasing the parasitic capacitance of the first pad 12 to the ground, the problem of input impedance mismatch caused by the equal parasitic capacitances of the first pad 11 and second pad 12 to the ground can be alleviated, and the performance of the low noise amplifier 20 can be improved.

According to the embodiment, the input impedance matching network provided includes a first pad 11, a second pad 12, and a first inductor L1 with one end connected to the first pad 11 and another end connected to the second pad 12; the first pad 11 is used as an input end of the input impedance matching network 10, the second pad 12 is used as an output end of the input impedance matching network 10, and is configured to be connected to an input end of a low noise amplifier 20; the compensation regulation circuit 13 connected with the first pad 11 or the second pad 12 is adopted to regulate the parasitic capacitance of the first pad 11 to the ground and/or a parasitic capacitance of the second pad 12 to the ground, so that the parasitic capacitance of the first pad 11 to the ground (Cgnd1) is greater than the parasitic capacitance of the second pad 12 to the ground (Cgnd2). This solution could alleviate the problem of impedance mismatch caused by the fact that the parasitic capacitance of the first pad 11 to the ground and the parasitic capacitance of the second pad 12 to the ground are equal, and thus realizing the impedance matching at the input end of the low noise amplifier 20.

In an embodiment, as shown in FIG. 6, the compensation regulation circuit 13 includes a capacitance compensation circuit 131 arranged between the first pad 11 and the ground, used for increasing the parasitic capacitance of the first pad 11 to the ground.

Generally speaking, during the operation of the input impedance matching network 10 formed by connecting the first pad 11, first inductor L1 and second pad 12 in series, the parasitic capacitance of the first pad 11 to the ground (Cgnd1) and the parasitic capacitance of the second pad 12 to the ground (Cgnd2) are the same, i.e., Cgnd1=Cgnd2. In this example, a capacitance compensation circuit 131 is provided between the first pad 11 and the ground, and the capacitance compensation circuit 131 can increase the parasitic capacitance of the first pad 11 to the ground. For example, if the capacitance compensation circuit 131 arranged between the first pad 11 and the ground forms a parasitic capacitance (Cgnd3) during operation, after the capacitance compensation circuit 131 is connected to the first pad 11 and the ground, the parasitic capacitance of the first pad 11 to the ground would be updated to Cgnd1'=Cgnd1+Cgnd3>Cgnd2. Understandably, since the parasitic capacitances of the first pad 11 and the second pad 12 to the ground are equal, in order to make the parasitic capacitance of the first pad 11 to the ground greater than that of the second pad 12 to the ground, a capacitance compensation circuit 131 may be arranged between the first pad 11 and the ground to increase the parasitic capacitance of the first pad 11 to the ground, which could alleviate the problem of impedance mismatch caused by the equal parasitic capacitances of the first pad 11 and the second pad 12 to the ground, and ensure the impedance matching of the input end of the low noise amplifier 20.

Figure 7:
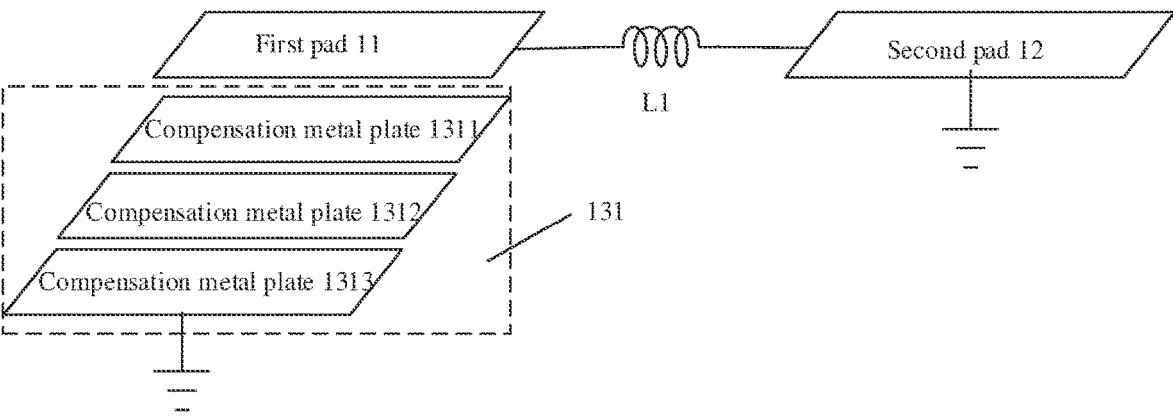
FIG. 7 is another circuit diagram of an input impedance matching network according to an embodiment of the present application.

In an embodiment, as shown in FIG. 7, the capacitance compensation circuit 121 includes at least two compensation metal plates 1311/1312/1313 arranged in parallel and oppositely, and projections of the at least two compensation metal plates 1311/1312/1313 at least partially overlap in a longitudinal direction; the compensation metal plate includes a first compensation metal plate and a second compensation metal plate; the first compensation metal plate and the second compensation metal plate are crossed, the first compensation metal plate 1313 is connected with the ground, and the second compensation metal plate 1311 is connected with the first pad 11.

In this example, the capacitance compensation circuit 131 includes at least two compensation metal plates 1311/1312/1313 arranged in parallel and oppositely, the first compensation metal plate 1313 is connected with the ground (i.e., the first compensation metal plate 1313 is a compensation metal plate connected to the ground); the second compensation metal plate 1311 is connected with the first pad 11 (i.e., the second compensation metal plate 1311 is a compensation metal plate connected to the first pad 11); so that the first pad 11 is connected to the ground through at least two compensation metal plates 1311/1312/1313. The projections of the at least two compensation metal plates 1311/1312/1313 are at least partially overlapped in the longitudinal direction, therefore the at least two compensation metal plates 1311/1312/1313 cooperate to form a parallel plate capacitor, which achieves the effect of increasing the parasitic capacitance of the first pad 11 to the ground, alleviates the problem of impedance mismatch caused by the equal parasitic capacitances of the first pad 11 and the second pad 12 to the ground, and ensures the impedance matching of the input end of the low noise amplifier 20.

In an embodiment, the compensation metal plates 1311/1312/1313 and the first pad 11 are arranged on different layers of a substrate.

In this example, at least two compensation metal plates 1311/1312/1313 are arranged in parallel and oppositely, thus at least two compensation metal plates 1311/1312/1313 are arranged on different layers of the substrate, which is conductive to reducing the area of the input impedance matching network 10, and hence further reducing the area of the amplification branch where the low noise amplifier 20 is located. The first compensation metal plate 1313 of the compensation metal plates 1311/1312/1313 is connected with the first pad 11, and the first compensation metal plate 1313 and the first pad 11 are arranged on different layers of the substrate, thus the first pad 11 and at least two compensation metal plates 1311/1312/1313 are arranged on different layers of the substrate.

Figure 8:
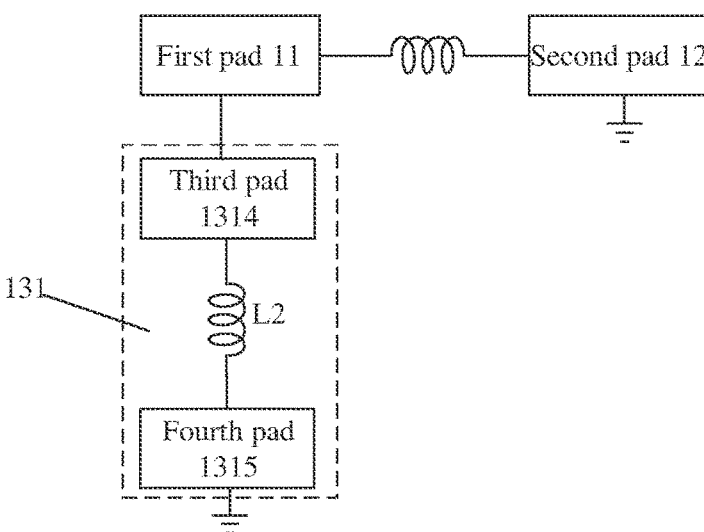
FIG. 8 is another circuit diagram of an input impedance matching network according to an embodiment of the present application.

In an embodiment, as shown in FIG. 8, the capacitance compensation circuit 131 includes a third pad 1314, a second inductor L2 and a fourth pad 1315 connected in series, wherein the third pad 1314 is connected to the first pad 11 and the fourth pad 1315 is connected to the ground.

In this example, the third pad 1314, the second inductor L2 and the fourth pad 1315 are arranged in series between the first pad 11 and the ground, wherein the third pad 1314 is connected with the first pad 11, and the fourth pad 1315 is connected with the ground, so that the capacitance compensation circuit 131 formed by the series connection of the third pad 1314, the second inductor L2 and the fourth pad 1315 could increase the parasitic capacitance of the first pad 11 to the ground. Thereby alleviating the problem of impedance mismatch caused by the equal parasitic capacitances of the first pad 11 and the second pad 12 to the ground, and ensuring the impedance matching of the input end of the low noise amplifier 20.

In an embodiment, the third pad 1314, the second inductor L2, the fourth pad 1315 and the first pad 11 are arranged on the same layer of the substrate.

In this example, the capacitance compensation circuit 131 formed by connecting the third pad 1314, the second inductor L2 and the fourth pad 1315 in series is arranged on the same layer of the substrate as the first pad 11, and the parasitic capacitances to the ground formed by the first pad 11 and the second pad 12 are counteracted through the second inductor L2, thus realizing impedance matching at the input end of the low noise amplifier.

Figure 9:
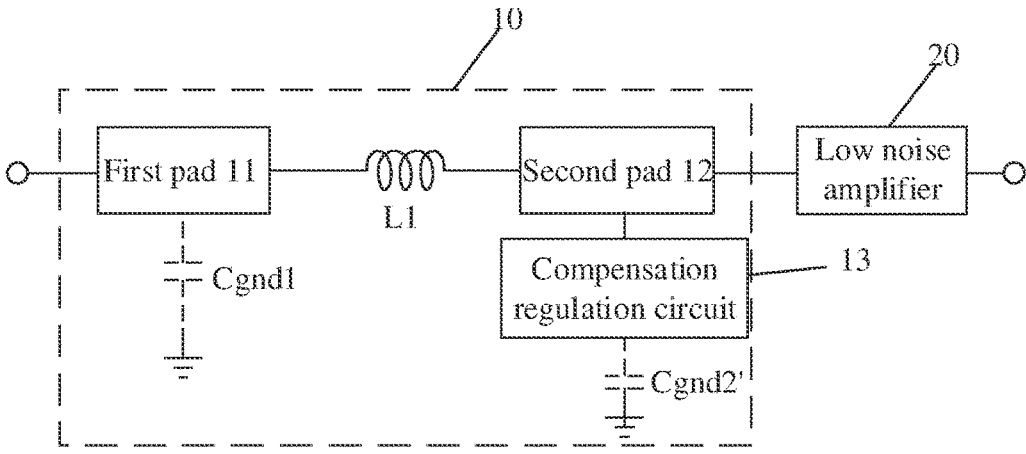
FIG. 9 is another circuit diagram of an input impedance matching network according to an embodiment of the present application.

In an embodiment, as shown in FIG. 9, the compensation regulation circuit 13 includes a capacitance compensation circuit 132 arranged between the second pad 12 and the ground, used for reducing the parasitic capacitance of the second pad 12 to the ground.

The capacitance regulation circuit 132 may be a circuit for adjusting the size of the second pad 12. In this embodiment, the parasitic capacitance of the second pad 12 to the ground is reduced by reducing the size of the second pad 12.

Generally speaking, during the operation of the input impedance matching network 10 formed by connecting the first pad 11, first inductor L1 and second pad 12 in series, the parasitic capacitance of the first pad 11 to the ground (Cgnd1) and the parasitic capacitance of the second pad 12 to the ground (Cgnd2) are the same, i.e., Cgnd1=Cgnd2. In this example, the capacitance regulation circuit 132 is provided between the second pad 12 and the ground, and the capacitance regulation circuit 132 may reduce the parasitic capacitance of the second pad 12 to the ground. For example, the capacitance regulation circuit 132 arranged between the second pad 12 and the ground reduces the parasitic capacitance of the second pad 12 to the ground (Cgnd2) to Cgnd2', and Cgnd2'<Cgnd2=Cgnd1. That is, by reducing the parasitic capacitance of the second pad 12 to the ground, the problem of input impedance conjugate point mismatch caused by the equal parasitic capacitances of the first pad 11 and the second pad 12 to the ground could be alleviated, and the performance of the low noise amplifier 20 is improved.

In an embodiment, the first pad 11, the first inductor L1 and the second pad 12 are arranged on the same layer of the substrate.

In this example, the first pad 11, the first inductor L1 and the second pad 12 are arranged on the same layer of the substrate, so that the input impedance matching network 10 formed by connecting the first pad 11, the first inductor L1 and the second pad 12 in series is arranged on the same layer of the substrate. Generally speaking, setting the first pad 11, the first inductor L1 and the second pad 12 on the same layer of the substrate is helpful to ensure the impedance matching effect of the input impedance matching network 10 formed by the first pad 11, the first inductor L1 and the second pad 12.

In an embodiment, the first pad 11, the first inductor L1 and the second pad 12 are arranged on the top layer of the substrate.

In this example, the first pad 11, the first inductor L1 and the second pad 12 are arranged on the same layer of the substrate, specifically on the top layer of the substrate. On the one hand, the impedance matching effect of the input impedance matching network 10 formed by the series connection of the first pad 11, the first inductor L1 and the second pad 12 can be ensured, and on the other hand, the welding of the first pad 11 and the second pad 12 can be facilitated.

One embodiment of the present application also provides a RF front-end module, which includes the input impedance matching network 10 provided in the above embodiments, and a low noise amplifier 20 connected to the input impedance matching network 10. The input impedance matching network 10 includes a first pad 11, a second pad 12, and a first inductor L1 with one end connected to the first pad 11 and another end connected to the second pad 12; the first pad 11 is used as an input end of the input impedance matching network 10, the second pad 12 is used as an output end of the input impedance matching network 10, and is configured to be connected to an input end of a low noise amplifier 20; the compensation regulation circuit 13 connected with the first pad 11 or the second pad 12 is adopted to regulate the parasitic capacitance of the first pad 11 to the ground and/or a parasitic capacitance of the second pad 12 to the ground, so that the parasitic capacitance of the first pad 11 to the ground (Cgnd1) is greater than the parasitic capacitance of the second pad 12 to the ground (Cgnd2). This solution could alleviate the problem of impedance mismatch caused by the fact that the parasitic capacitance of the first pad 11 to the ground (Cgnd1) and the parasitic capacitance of the second pad 12 to the ground (Cgnd1) are equal, and thus realizing the impedance matching at the input end of the low noise amplifier 20.

In an embodiment, as shown in FIG. 10, the low noise amplifier 20 includes a RF amplification circuit 21, a first capacitive element 22, a second capacitive element 23 and an impedance matching circuit 24. One end of the RF amplification circuit 21 is connected to the second pad 12, and another end is connected to the signal output end through the first capacitive element 22. One end of the second capacitive element 23 is connected to a connection node between the RF amplifier circuit 21 and the first capacitive element 22, and another end is connected to the ground. One end of the impedance matching circuit 24 is connected to a power supply end, and another end is connected to a connection node between the RF amplification circuit 21 and the first capacitive element 22.

The RF amplification circuit 21 is a circuit for amplifying RF signals. The first capacitive element 22 is an element with adjustable capacitance value. By adjusting the capacitance value of the first capacitance element 22, impedance matching of other circuits connected to the RF amplification circuit 21 and the signal output end is realized. On the connection node between the RF amplifier circuit 21 and the first capacitor element 22, a second capacitive element 23 and an impedance matching circuit 24 are arranged in parallel, and impedance matching is realized through the cooperation between the second capacitive element 23 and the impedance matching circuit 24.

As an example, as shown in FIG. 10, the RF amplification circuit 21 includes a first amplification transistor M21, a second amplification transistor M22, an input DC blocking capacitor C21, a RF ground capacitor C22 and a gain regulation inductor L21; a signal control end of the first amplification transistor M21 is connected with the second pad 12 through the input DC blocking capacitor C21, and a first connection end of the first amplification transistor M21 is connected with a second connection end of the second amplification transistor M22, a second connection end of the first amplifier transistor M21 is connected to the ground through the gain regulation inductor L21, a signal control end of the second amplification transistor M22 is connected to the impedance matching circuit 24, and connected to the ground through the RF ground capacitor C22, and a first connection end of the second amplification transistor M22 is connected to the first capacitive element 22.

In this example, the RF signal output from the second pad 12 of the input impedance matching network 10 is sent to the first amplification transistor M21 through the input DC blocking capacitor C21, and the RF signal is coupled to the first amplification transistor M21 by adopting the DC blocking characteristic of the input DC blocking capacitor C21. The RF signal is amplified by the first amplification transistor M21 and the second amplification transistor M22. And in the amplification process, the RF ground capacitor C22 is connected with the signal control end of the second amplification transistor M22 and the ground, thus the effect that the radio frequency reaches the ground can be realized. The gain regulation inductor L21 is connected with the second connection end of the first amplification transistor M21 and the ground, so as to achieve the effect of gain adjustment, thus ensuring the quality of the amplified RF signal. The first connection end of the second amplification transistor M22 is connected to the first capacitive element 22, and the amplified RF signal can be output to the first capacitive element 22, so that impedance matching can be realized through the first capacitive element 22.

As an example, as shown in FIG. 10, the impedance matching circuit 24 includes a matching inductor L22, a first resistor R21 and a second resistor R22 arranged in parallel. One end of the first resistor R21 is connected to the power supply end, and another end is connected to a connection node between the signal control end of the second amplification transistor M22 and the RF ground capacitor C22. One end of the matching inductor L22 is connected to the power supply end, and another end is connected to a connection node between a first connection end of the second amplification transistor M22 and the first capacitive element 22. One end of the second resistor R22 is connected to the power supply end, and another end is connected to a connection node between a first connection end of the second amplification transistor M22 and the first capacitive element 22.

The above embodiments are only used to illustrate the technical solution of the present application, rather than limit it. Although the application has been described in detail with reference to the foregoing embodiments, it should be understood by those skilled in the art that it is still possible to modify the technical solutions described in the foregoing embodiments, or equivalently replace some technical features thereof. These modifications and equivalents do not make the nature of the corresponding technical solution deviates from the spirit and scope of the present application, and shall be included in the protection scope of the present application.

What is claimed is:

1. An input impedance matching network, comprising a first pad, a second pad, and a first inductor with one end connected to the first pad and another end connected to the second pad; an output end of the second pad, as an output end of the input impedance matching network, is configured to be connected to an input end of a low noise amplifier; the input impedance matching network further comprises a compensation regulation circuit connected with the first pad and/or the second pad, and the compensation regulation circuit is configured to regulate a parasitic capacitance of the first pad to a ground and/or a parasitic capacitance of the second pad to a ground, so that the parasitic capacitance of the first pad to the ground is greater than that of the second pad to the ground;

wherein the compensation regulation circuit comprises:

a capacitance compensation circuit arranged between the first pad and the ground, configured to increase the parasitic capacitance of the first pad to the ground;

and/or a capacitance regulation circuit arranged between the second pad and the ground, configured to reduce the parasitic capacitance of the second pad to the ground.

2. The input impedance matching network of claim 1, wherein the capacitance compensation circuit comprises at least two compensation metal plates arranged in parallel and oppositely, and projections of the at least two compensation metal plates at least partially overlap in a longitudinal direction; the compensation metal plate comprises a first compensation metal plate and a second compensation metal plate; the first compensation metal plate and the second compensation metal plate are crossed, the first compensation metal plate is connected with the ground, and the second compensation metal plate is connected with the first pad.

3. The input impedance matching network of claim 2, wherein the compensation metal plate and the first pad are arranged on different layers of a substrate.

4. The input impedance matching network of claim 1, wherein the capacitance compensation circuit comprises a third pad, a second inductor and a fourth pad connected in series; the third pad is connected with the first pad, and the fourth pad is connected with the ground.

5. The input impedance matching network of claim 4, wherein the third pad, the second inductor, the fourth pad and the first pad are arranged on a same layer of the substrate.

6. The input impedance matching network of claim 1, wherein the first pad, the first inductor and the second pad are arranged on a same layer of the substrate.

7. A RF front-end module, comprising an input impedance matching network and a low noise amplifier connected to the input impedance matching network;

the input impedance matching network comprises a first pad, a second pad, and a first inductor with one end connected to the first pad and another end connected to the second pad; an output end of the second pad, as an output end of the input impedance matching network, is configured to be connected to an input end of a low noise amplifier; the input impedance matching network further comprises a compensation regulation circuit connected with the first pad and/or the second pad, and the compensation regulation circuit is configured to regulate a parasitic capacitance of the first pad to a ground and/or a parasitic capacitance of the second pad to a ground, so that the parasitic capacitance of the first pad to the ground is greater than that of the second pad to the ground;

wherein the compensation regulation circuit comprises:

a capacitance compensation circuit arranged between the first pad and the ground, configured to increase the parasitic capacitance of the first pad to the ground;

and/or a capacitance regulation circuit arranged between the second pad and the ground, configured to reduce the parasitic capacitance of the second pad to the ground.

8. The RF front-end module of claim 7, wherein the capacitance compensation circuit comprises at least two compensation metal plates arranged in parallel and oppositely, and projections of the at least two compensation metal plates at least partially overlap in a longitudinal direction; the compensation metal plate comprises a first compensation metal plate and a second compensation metal plate; the first compensation metal plate and the second compensation metal plate are crossed, the first compensation metal plate is connected with the ground, and the second compensation metal plate is connected with the first pad.

9. The RF front-end module of claim 8, wherein the compensation metal plate and the first pad are arranged on different layers of a substrate.

10. The RF front-end module of claim 7, wherein the capacitance compensation circuit comprises a third pad, a second inductor and a fourth pad connected in series; the third pad is connected with the first pad, and the fourth pad is connected with the ground.

11. The RF front-end module of claim 10, wherein the third pad, the second inductor, the fourth pad and the first pad are arranged on a same layer of the substrate.

12. The RF front-end module of claim 7, wherein the first pad, the first inductor and the second pad are arranged on a same layer of the substrate.

13. The RF front-end module of claim 7, wherein the low noise amplifier comprises a RF amplification circuit, a first capacitive element, a second capacitive element and an impedance matching circuit; one end of the RF amplification circuit is connected with the second pad, and another end is connected with a signal output end through the first capacitive element; one end of the second capacitive element is connected with a connection node between the RF amplification circuit and the first capacitive element, and another end is connected with the ground; one end of the impedance matching circuit is connected with a pow supply end, and another end is connected with a connection node between the RF amplification circuit and the first capacitive element.

* * * * *